Dec. 20, 1966  M. RANDALL  3,292,194
MACHINE FOR CLEANSING SHEETS OF MATERIAL
Filed Sept. 9, 1965  6 Sheets-Sheet 1
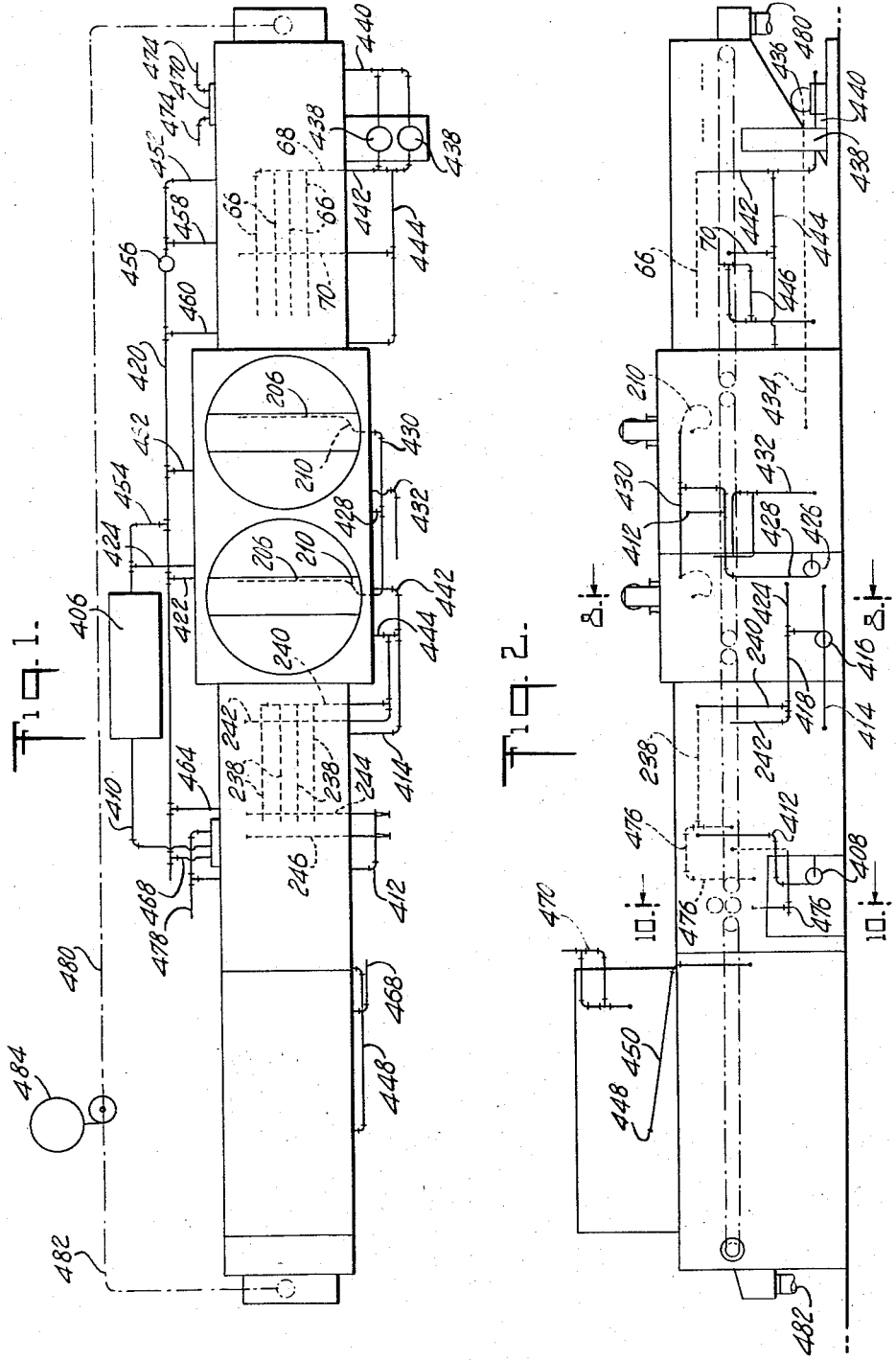
INVENTOR
MAX RANDALL
BY
Irving Seidman
ATTORNEY

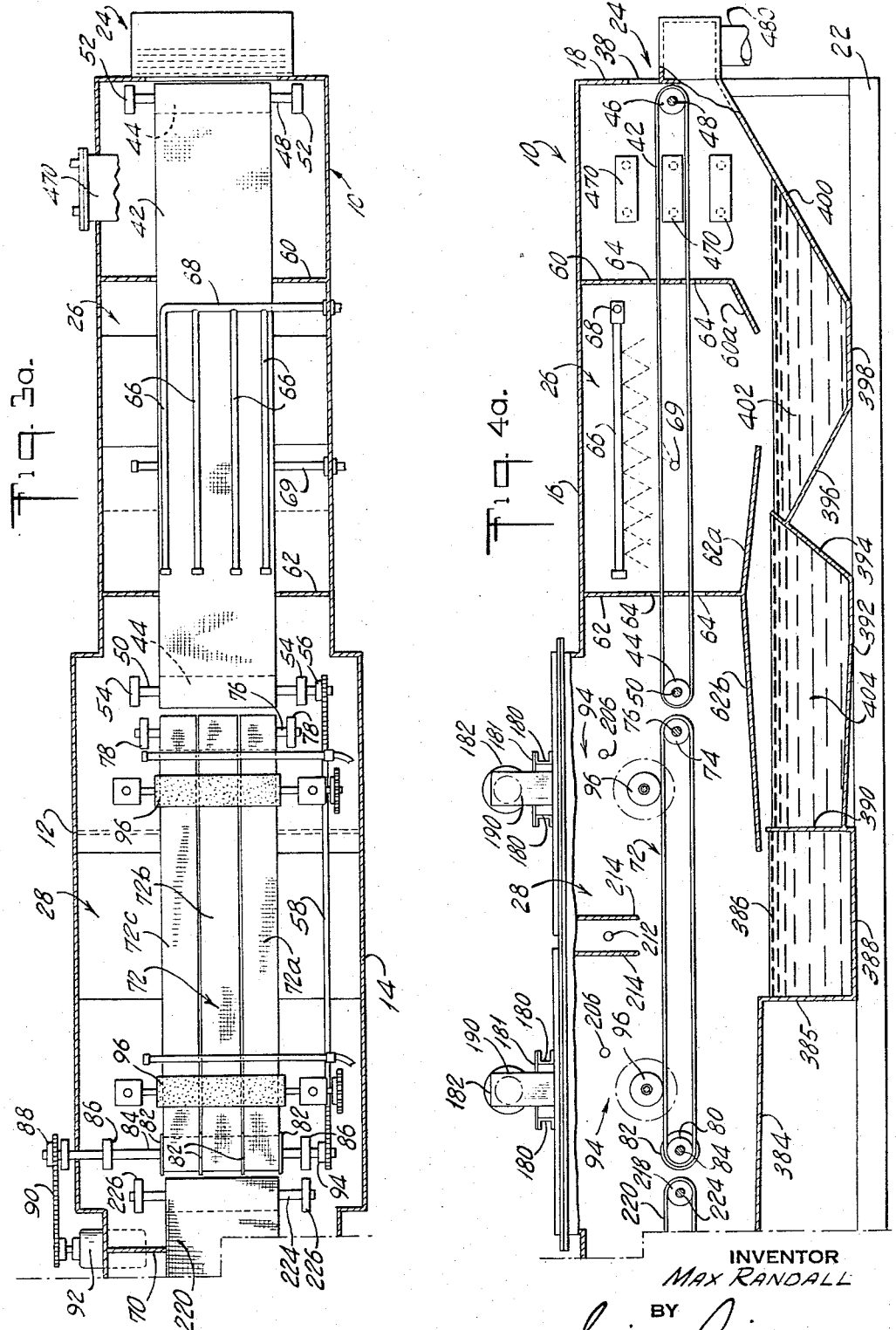

Dec. 20, 1966 M. RANDALL 3,292,194
MACHINE FOR CLEANSING SHEETS OF MATERIAL
Filed Sept. 9, 1965 6 Sheets-Sheet 3
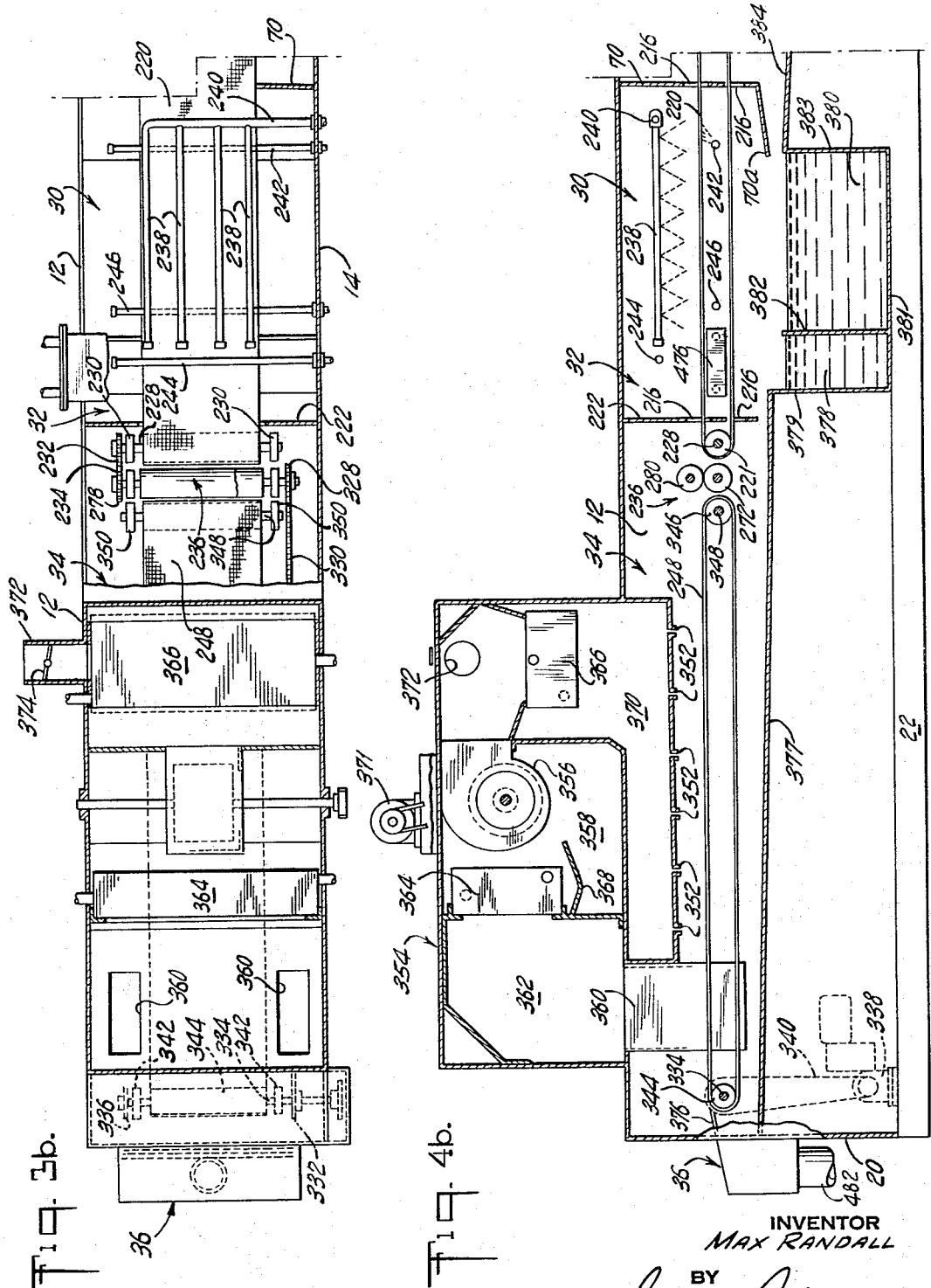
INVENTOR
MAX RANDALL
BY
Irving Seidman
ATTORNEY

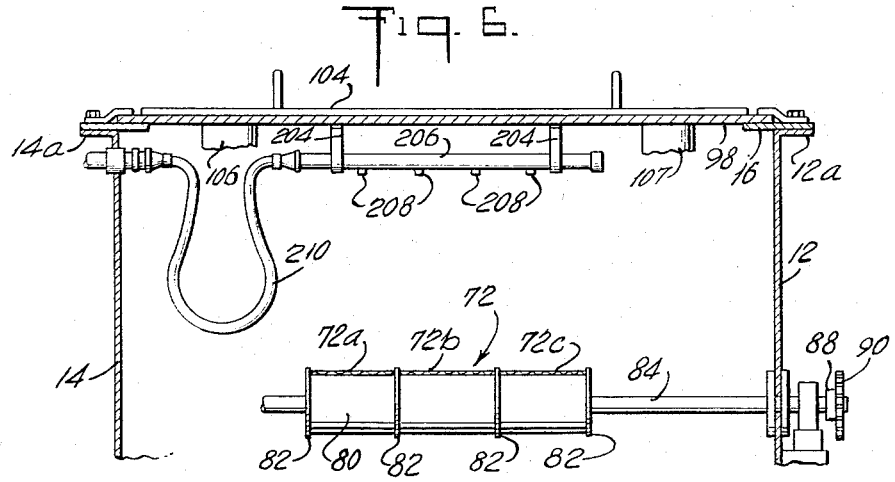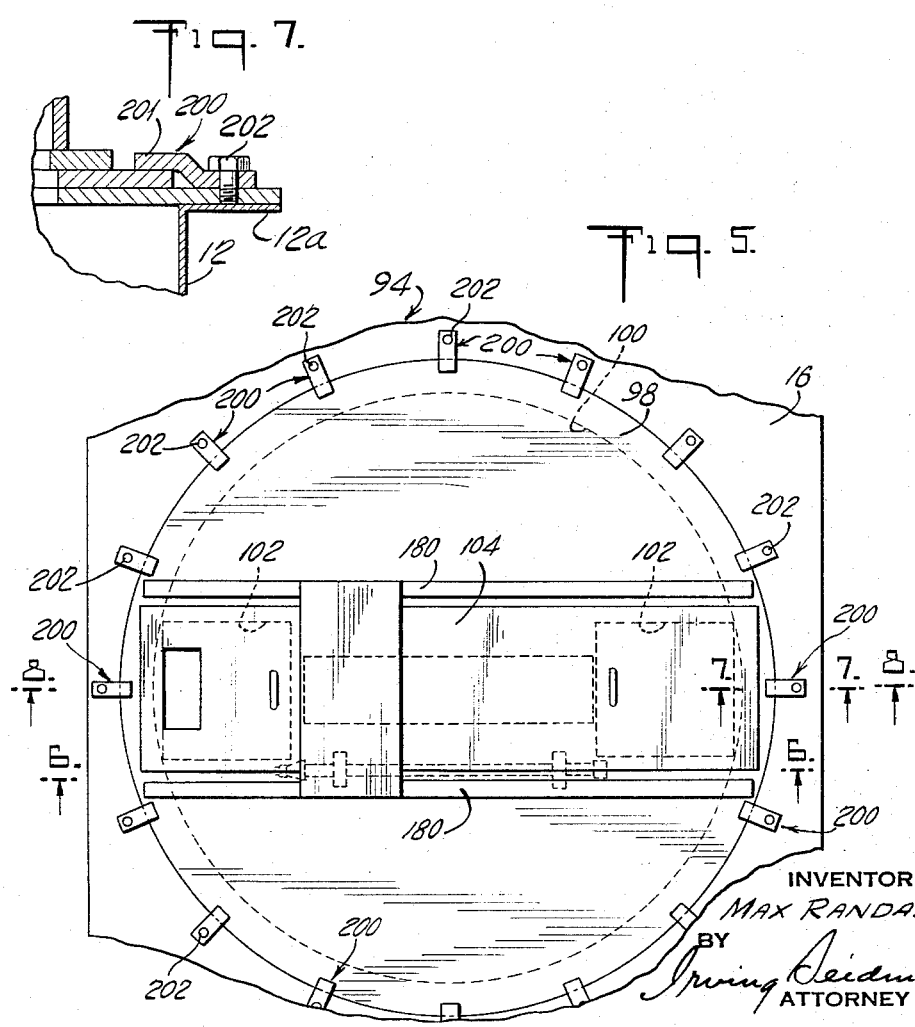

Dec. 20, 1966  M. RANDALL  3,292,194
MACHINE FOR CLEANSING SHEETS OF MATERIAL
Filed Sept. 9, 1965  6 Sheets-Sheet 5
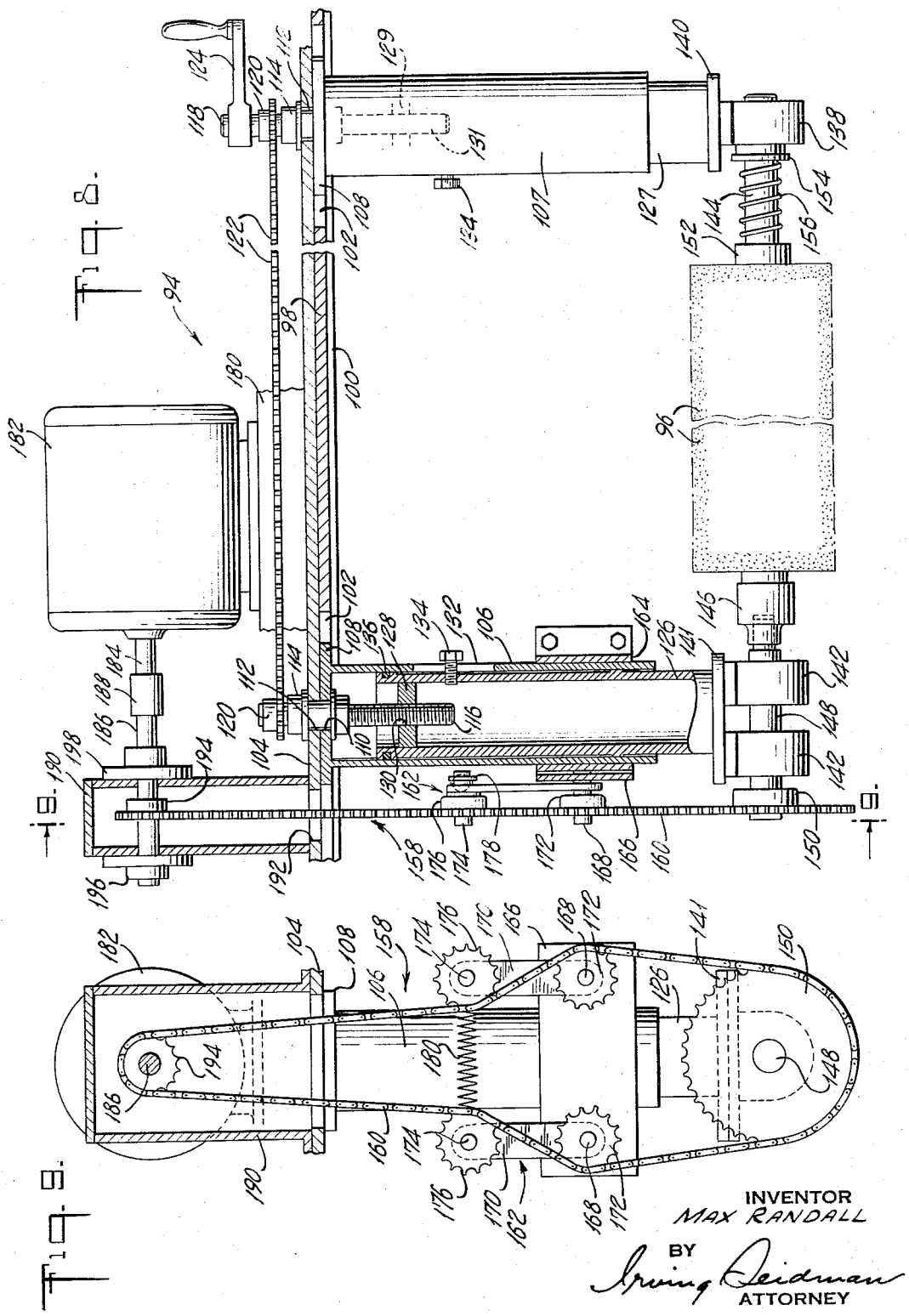
INVENTOR
MAX RANDALL
BY Irving Seidman
ATTORNEY

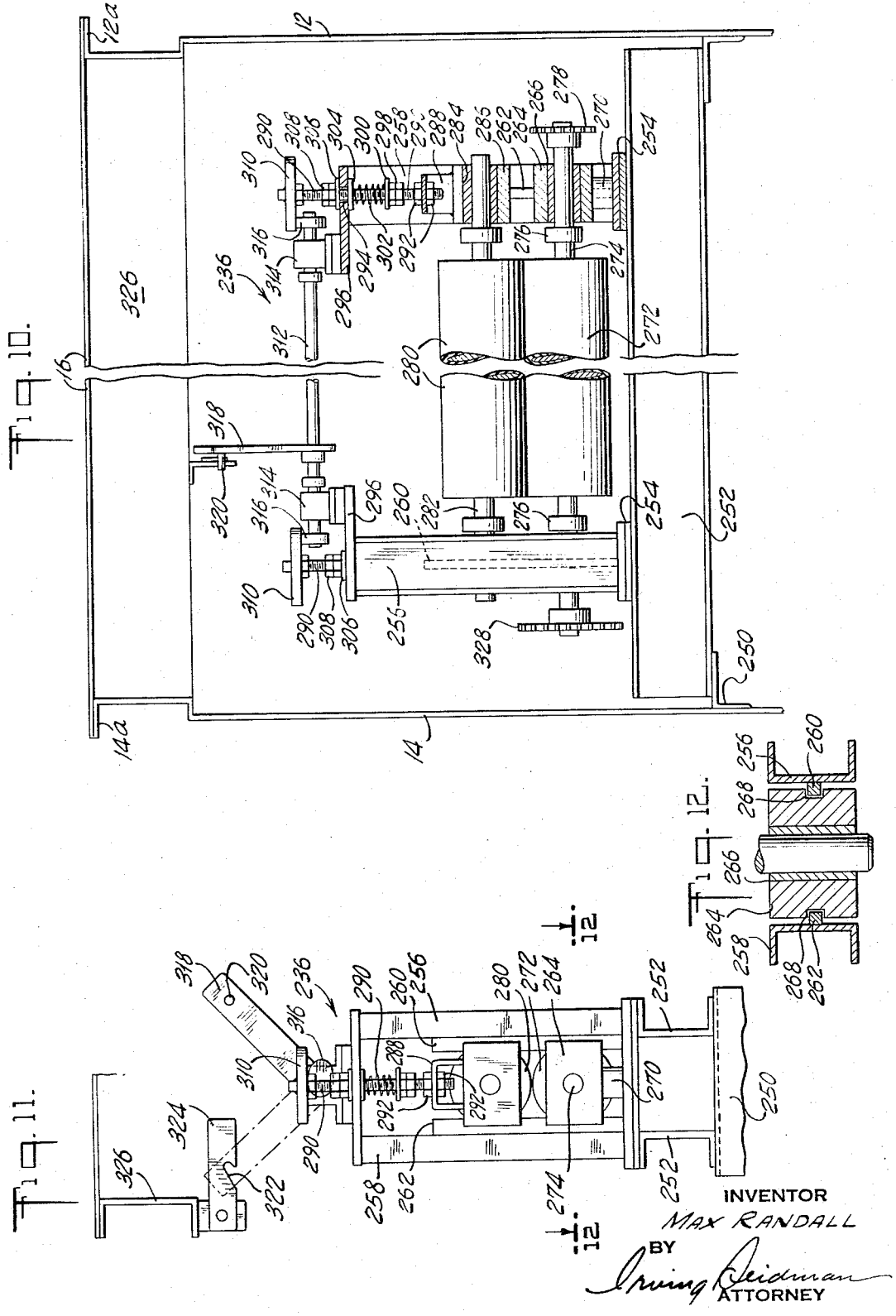

United States Patent Office 3,292,194
Patented Dec. 20, 1966

3,292,194
MACHINE FOR CLEANSING SHEETS OF
MATERIAL
Max Randall, 525 Longview Road,
South Orange, N.J. 07079
Filed Sept. 9, 1965, Ser. No. 485,986
16 Claims. (Cl. 15—77)

This invention relates generally to a machine for removing smut from sheets of material and more particularly, to a machine for removing masking ink from relatively small sheets of material such as anodized aluminum name plates.

Sheet cleaning machines for removing smut from sheets of metal have been proposed in the past. However, in order to contain all the solvent vapors within the confines of the machines, the machines were hopper-shaped in design. Because of their shape, the machines of the prior art occupied a relatively large area and, since the path of travel of the sheets of material was not horizontal, complicated conveyor systems were required to transport the work through the machines. More particularly, gripping fingers were provided to grip the work to maintain the work on the conveyor systems as the work travelled down one side of the hopper-shaped machine and up the opposite side. This requirement substantially added to the cost and maintenance of such machines.

The scrubbing station was an integral part of the machines of the prior art and comprised at least one rotating brush which brushed the surface of the work as the work travelled past the scrubbing station. However, in the majority of machines, the scrubbing action left streak marks on the sheets which necessitated further cleaning operations after the sheets left the machines. Hence, the operation of such machines left much to be desired.

Accordingly, it is an object of the present invention to provide a machine for automatically cleaning smut from sheets of material wherein the path of travel of the work is substantially in a horizonal plane.

Another object of the present invention is to provide a simple conveyor system in a machine of the type described which transports sheets of material through a brushing stage without the necessity for special gripping devices.

A further object of the present invention is to provide a sheet cleaning machine which automatically loads, scrubs, dries and unloads the individual sheets of material.

Still another feature of the present invention is to provide a sheet cleaning machine having brushes depending from rotatable turret heads so that the brushes may be positioned in any desired angular position relative to the path of travel of the sheets to provide optimum results and eliminate possible brush streaks on the sheets.

An additional object of the present invention is to provide a machine for cleaning metal sheets which utilizes the counter-flow cascade principle in applying the cleaning solvent to the sheets of material in the various rinse stages of the machine.

Additional objects and advantages of the present invention will become more apparent from a consideration of the following detailed description when taken in conjunction with the accompanying drawings, in which:

FIGS. 1 and 2 are respective top plan and vertical sectional views of the sheet cleaning machine of the present invention illustrating the piping connections diagrammatically;

FIGS. 3a and 3b, when placed side by side with FIG. 3a to the right of FIG. 3b, are horizontal sectional views of the machine;

FIGS. 4a and 4b, when placed side by side with FIG. 4a to the right of FIG. 4b, are vertical sectional views of the machine illustrated in FIGS. 3a and 3b;

FIG. 5 is a top plan view, to enlarged scale, of a brush assembly of the present invention;

FIG. 6 is a sectional view taken along line 6—6 of FIG. 5;

FIG. 7 is a detailed sectional view of a brush assembly clamp taken along line 7—7 of FIG. 5;

FIG. 8 is a sectional view with parts broken away, taken along line 8—8 of FIGS. 2 and 5, illustrating the height varying mechanism for the brush assembly of the present invention;

FIG. 9 is a sectional view taken along line 9—9 of FIG. 8;

FIG. 10 is a sectional view, with parts broken away, taken along line 10—10 of FIG. 2, illustrating the squeegee apparatus of the present invention;

FIG. 11 is a side elevational view of the apparatus illustrated in FIG. 10, and

FIG. 12 is a sectional view taken along line 12—12 of FIG. 11.

The drawings are substantially to scale of a working model of the present invention. Like numbers in the various figures indicate identical elements.

Although the machine of the present invention will be described in conjunction with the removal of masking coatings from small anodized aluminum sheets of the type utilized in the process of producing metal foil labels, this description is by way of example only and not by way of limitation. That is, the present machine is adapted to clean sheet materials of any type or size.

The machine 10 of the present invention is illustrated in FIGS. 3a, 3b and 4a, 4b and includes a front wall 18, a rear wall 20, the side walls 12 and 14, and a horizontal bed or frame 22. The top edge of the side walls 12 and 14 are provided with the respective laterally extending flanges 12a and 14a (FIG. 6) to which the top wall 16 is connected. The machine 10 includes seven general sections: a load end 24; a wash section 26; a scrubbing section 28; a rinse section 30; a final rinse section 32; a drying section 34; and an unload end 36. The path of travel of the sheets of material is from the load end 24, rearwardly, through the intermediate sections, to the unload end 36 of the machine. While the machine may be use for other purposes, it is ideally suited for removing the masking coatings applied to anodized aluminum name plates in the process of making aluminum foil labels. The masking coating applied to such sheets is extremely tenacious in its adherence to the sheet surface and is extremely difficult to wash off, even with ink solvent. By the use of machine 10, the sheets can be cleansed in an extremely efficient and economical manner. While the machine is particularly suited for processing sheets having a thickness of 0.003 inch, the machine is not restricted to sheets of this particular thickness.

In contradistinction to most machines of this type, the machine 10 may be mounted on a horizontal bed or frame 22 and the path of travel of the sheets through the machine is in a horizontal plane. As a feature of the machine, the solvent vapor is contained within the machine by a series of strategically located baffles and condensing units. Additionally, ducts located adjacent the load end 24 and the unload end 36 of the machine capture the solvent vapors attempting to exit therethrough.

Wash section

The sheets of material which are to be cleansed are fed into the machine 10 through an opening 38 in the end wall 18 at the load end 24 of the machine. An automatic sheet feeding device (not shown) such as a conventional printing press feeding apparatus, may be utilized at the load end 24 of the machine to automatically feed the smut covered sheets of material into the machine. An endless conveyor belt 42, preferably of the flat wire mesh type, extends through the wash section 26. The conveyor belt 42 carries the sheets of material rearwardly, from the load end 24 of the machine, through the section 26, into the scrubbing section 28. The continuous belt 42 is mounted between the rolls 44 and 46 which, in turn, are respectively fixedly mounted on the respective idler and driven shafts 48 and 50. The shaft 48 is received between the bearing supports 52 and is freely rotatable therein. The driven shaft 50 is received between the bearing supports 54 and includes a portion which projects beyond the bearing support adjacent the wall 14, which fixedly receives a sprocket wheel 56 thereon. The shaft 50 is driven by a chain 58, as noted in detail below, which is in meshing engagement with the sprocket wheel 56 and which moves the belt 42 in the desired direction.

Opposed, longitudinally spaced baffles 60 and 62 depend from the top wall 16 and extend between the side walls 14 and 12 of the machine 10. The baffle 60 terminates in a downwardly, rearwardly sloping member 60a which is spaced above the bottom of the machine. The baffle 62 includes a member 62a which slopes downwardly, forwardly and which is spaced from the member 60a and the bottom of the machine. The baffle 62 further includes a member 62b which is inclined downwardly rearwardly into the scrubbing section 28 of the machine 10. The baffles 60 and 62 are provided with the aligned vertically spaced sets of apertures 64 through which the belt 42 is free to move. The baffles 60 and 62 define the wash section 26 of the machine.

A header 68 extends transversely into the washing section 26 through an appropriate aperture in the side wall 14. A plurality of transversely spaced, longitudinally extending spray pipes 66 are connected to header 68 and are positioned to overlie the conveyor belt 42 provided with longitudinally spaced apertures so that the solvent supplied to the header 68, in the manner noted below, will be sprayed through the aforementioned apertures on to the upper surface of the sheets of material on the conveyor 42.

A lower spray pipe 69 extends transversely in the wash section 26, through an appropriate aperture in the side wall 14, between the superposed portions of the belt 42. The pipe 69 is provided with a plurality of transversely spaced apertures which are positioned so that the solvent supplied to the pipe 69 will be sprayed through these apertures on to the undersurface of the sheets of material.

*Scrubbing section*

The scrubbing section 28 of the device 10 is defined by the baffle 62 and a baffle 70 which depends from the top wall 16 and which extends transversely between the side walls 12 and 14. The baffle 70 terminates above the frame 22 in a member 70a which is inclined downwardly rearwardly in the rinse section 30. As noted in greater detail below, a plurality of brushes 96 are provided in the scrubbing section 28. These brushes are angularly adjustable with respect to the path of travel of the sheets and are vertically adjustable to accommodate any thickness of sheets to provide optimum cleaning of the sheets and prevent possible brush streaks from appearing on the sheets. Additionally, the material is transported past the brushes without the need for special devices to grip the sheets.

More specifically, the work sheets which are carried by the conveyor belt 42 are transferred to a longitudinally extending endless conveyor belt 72 in the scrubbing section 28 which is spaced from the conveyor 42 by a distance less than the width of the smallest sheet. The conveyor 72 transports the sheets rearwardly through the scrubbing section. In accordance with a feature of the present invention, the endless conveyor belt 72 comprises a plurality of transversely spaced fabric belts 72a, 72b and 72c being formed of a material which will cause the sheets to adhere to the belts. An idler roll 74, which is positioned adjacent the roll 44, supports the fabric belts 72a, 72b and 72c at one end. The roll 74 is fixedly mounted on a shaft 76 which is rotatably supported in the bearings 78. At the other end, the respective belts are supported by a driven roll 80 having laterally spaced radially extending flanges 82. Each of the belts 72a, 72b and 72c is received vetween a pair of adjacent flanges 82 and the flanges 82 are sized to project slightly above the upper surface of the respective belts (FIG. 6). The sheets of material naturally adhere to the fabric conveyor belts 72. Thus, the brushing or scrubbing of the sheets of material in the scrubbing section 28 may be accomplished without the necessity of providing gripping fingers on the conveyor belt to hold the material in place, as has been the practice heretofore. Accordingly, a great economical advantage is obtained by the use of the fabric conveyor belt. The flanges 82, in addition to insuring accurate tracking of the belts, positively breaks the adhesion between the thin aluminum sheets and the conveyor belts 72a–72c as the work leaves the conveyor belts. That is, since the flanges 82 project above the surface of the belt, the flanges will separate the sheets from the upper surface of the belt as the sheets pass over the roll 80.

The driven roll 80 is fixedly mounted on a shaft 84 which is rotatable in the bearing supports 86. One end of the shaft 84 projects through an appropriate aperture in the side wall 12 of the machine 10 and fixedly receives a sprocket wheel 88 thereon. A chain 90 connects the sprocket wheel 88 to the output shaft of a motor 92. The other end of the shaft 84 extends beyond the associated bearing support 86 and similarly fixedly receives a sprocket wheel 94 thereon. The chain 58 is received in meshing engagement with the sprocket wheel 94. The motor 92 drives the roll 80, through the connection of the chain 90, and the roll 44 through the connection of the chain 58. Thus, the single motor 92 supplies driving power for both the belt 42 and the belt 72 in the respective wash section 26 and the scrubbing section 28 of the machine.

Two longitudinally spaced scrubbing assemblies 94 are provided in the scrubbing section 28. Each of the scrubbing assemblies 94 includes a brush 96 which overlies the upper surface of the conveyor belt 72 and which is adapted to scrub the upper surface of the sheets of material which are carried by the conveyor belt 72 through the scrubbing section 28. Since the brushing assemblies 94 are identical only one will be described in detail.

As shown in FIGS. 5–9, the brush assembly 94 includes a circular turrent plate 98 which is adapted to overlie a bore 100 provided in the top wall 16 of the machine 10. The turrent plate 98 is provided with diametrically opposed rectangular openings 102 therethrough (FIG. 8) which are spaced inwardly from the peripheral wall of the turrent. A rectangular plate 104 is fixedly mounted on the turret plate 98 and overlies the openings 102. A pair of hollow open-ended stationary stanchions, respectively designated 106 and 107, depend from the plate 104. The stanchion 106 extends through one opening 102 and the stnchion 107 extends through the other opening 102. The stanchions 106 and 107 are provided with respective radially extending flanges 108 which are adapted to abut the undersurface of the plate 104 and through which appropriate bolts (not shown) may pass to connect the respective stanchions to the plate 104. The stanchions 106, 107 and the plate 104 are provided with respective aligned apertures 110 and 112. The respective shaft supports 114 are received within the aligned apertures 110 and 112 and each shaft support rotatably receives a respective threaded shaft 116 and 118 therethrough. The sprocket wheels 120 are fixedly connected to the respective shafts 116 and 118 and are interconnected by a chain 122. A handle 124 is fixedly received on the end of the shaft 118. Thus, the shafts 118 and 120 will rotate in unison when the handle 124 is rotated.

The movable hollow stanchions 126 and 127 are slidably received within the respectve stationary stanchions 106 and 107. Provided in the movable stanchions 126 and 127 are respective transverse walls 128 and 129 which are positioned below the top edge of the associated stanchion. The walls 128 and 129 are respectively provided with the threaded apertures 130 and 131. The aperture 130 threadedly engages the shaft 116 and the aperture 131 threadedly engages the shaft 118. Hence, rotation of the shafts 116 and 118 will effect axial or vertical movement of the movable stanchions 126 and 127.

A vertically extending elongated slot 132 is provided in the wall of the stationary stanchions 106 and 107. A different bolt 134 extends through each of the slots 132 and is threadedly received in the wall of the respective movable stanchions 126 and 127. Each of the bolts 134 is adapted to abut the bottom and top edges of the associated slot 132 to limit the vertical movement of the movable stanchions.

A gasket 126 is received in a groove adjacent the top of each of the movable stanchions and is compressed between the inner surface of the respective stationary stanchion and the associated movable stanchion to provide a snug fit between the two.

The movable stanchion 127 is provided with a bottom transverse flange 140. A shaft support 138 is connected to the bottom surface of the flange 140. Similarly, the movable stanchion 126 is provided with a bottom transverse flange 141. A pair of shaft supports 142 depend from the flange 141. The brush 96 is fixedly received on a coaxial shaft 144, one end of which is rotatably received in the shaft support 138. The other end of the shaft 144 terminates in a coupling member 146. A shaft 148 is rotatably supported by the supports 142 and is connected to the brush shaft 144 by the coupling member 146. A sprocket wheel 150 is fixedly received on the end of the shaft 148 forwardly of the support members 142 (FIG. 8). The brush 96 is provided with a collar 152 which is positioned opposite a collar 154. Collar 154 is integral with the support 138. A spring 156 is compressed between the collars 152 and 154 and biases the brush 96 toward the left, as taken in FIG. 8, to maintain the distance between the sprocket wheel 150 and the adjacent support 142 constant.

The driving mechanism for the brush 96 is designated generally by the numeral 158 (FIGS. 8 and 9) and includes a chain 160 which connects the output shaft of a motor in driving relation with the sprocket wheel 150. More particularly, the driving mechanism 158 includes a "slack take-up arrangement," designated generally by the numeral 162, which maintains the chain 160 taut regardless of the vertical position of the brush 96. The take-up arrangement 162 includes a ring clamp 164 which is adapted to encircle the lower portion of the stationary stanchion 106 and which has integral outwardly projecting flanges 163 which receives bolts therethrough to affix the clamp in place in the conventional manner. A rectangular plate 166 is connected to the ring clamp 164 by any conventional means, as by welding, and extends in a plane tangential to the point of connection. The plate 166 is provided with longitudinally spaced apertures (not shown) which fixedly receive the stub shafts 168 therein. The respective elongated arms 170 are rotatably received on the shafts 168. Each of the stub shafts 168 also rotatably receives a sprocket wheel 172 thereon. Additionally, the free ends of the arms 170 are provided with apertures which receive the idler shafts 174 therein. The idler sprocket wheels 176 are rotatably received on the respective idler shafts 174. The respective spring seats 178 are affixed to the rear upper end of the arms 170 and a spring 180 extends between the arms 170 and is connected to the respective spring seats 178 and biases the upper ends of the arms 170 inwardly, toward each other.

A pair of channels 180 (FIG. 5) are mounted on the turret plate 98 and are spaced from and parallel to the opposed longtitudinal edges of the plate 104. The channels 180 support the driving motor 182 which forms a part of the brush driving mechanism 158. The output shaft 184 of the motor 182 is connected to a shaft 186 by a coupling member 188 (FIG. 8). The shaft 186 is rotatably received through an aperture in a housing 190 which encloses an aperture 192 formed in the plate 104. The aperture 192 overlies a portion of the opening 102. A sprocket wheel 194 is fixedly mounted on the shaft 186 within the housing 190 and the respective collars 196 and 198, which are fixedly mounted on the shaft 186. are adapted to abut the outer surfaces of the housing 190 to maintain the sprocket wheel 194 in place.

As shown in FIG. 9, the chain 160 extends about the sprocket wheel 194, through the aperture 192 and the opening 102, about the inner teeth of the idler wheels 176 and the outer teeth of the sprocket wheels 172 and about the sprocket wheel 150. Thus, rotation of the sprocket wheel 194 by the motor 182 causes rotation of the brush 96. Movement of the brush 96 upwardly, by rotating the handle 124 in the appropriate direction, causes a slack to exist in the chain 160. However, the spring 180 biases the arms 170 toward each other thereby causing the idler wheels 176 to move inwardly toward each other to take up the slack that exists in the chain. On the other hand, when the brush 96 is lowered the slack in the chain 160 will decrease. Thus, the idler wheels 176 are forced away from each other to thereby maintain the tension in the chain constant at all times.

The turret plate 98 is maintained in place by the plurality of circumferentially spaced clamps 200 (FIGS. 5 and 7) which are connected to the top wall 16 of the machine 10 by the respective bolts 202 and which include a portion 201 which is spaced from the top wall 16 and which is adapted to overlie and bear upon the top surface of the turret plate 98. When the bolts 202 are tightened, the outer edges of the turret plate will be clamped between the member 201 of the clamp 200 and the top wall 16 of machine 10. When it is desired to change the angular position of the brush 96 with respect to the path of travel of the sheets being carried by the conveyor belt 72, the bolts 202 are loosened and the turret plate 98 rotated to its new position. Thereafter, the bolts 202 are tightened to clamp the turret plate in place.

The support members 204 (FIG. 6) depend from the turret plate 98 forwardly of the stanchions 106 and 107 and support a transversely extending spray pipe 206 which is provided with a plurality of sprayheads 208. The pipe 206 is connected to a source of solvent or detergent by a flexible coupling 210; the length of the coupling 210 is sufficient to allow a 360 degree rotation of the plate 98.

Additionally, as shown in FIG. 4a, a pair of opposed baffles 214 depend from the top wall 16 and extend between the side walls 12 and 14 of the machine 10. The baffles 214 are located intermediate the brush assemblies 94 and a spray pipe 212 extends transversely in the scrubbing section 28 between the baffles.

*Rinse section*

The rinse section 30 and the final rinse section 32 (FIGS. 3b, 4b) are defined by the baffle 70 and a baffle 222 which depends from the top wall 16 and extends transversely between the side walls 12 and 14. The baffles 70 and 222 are provided with the aligned, vertically spaced pairs of openings 216 through which the upper and lower surfaces of an endless conveyor belt 220 extend. The conveyor belt 220 is adapted to receive the sheets from the scrubbing section 28 and transport these sheets through the respective rinse sections 30 and 32. The belt 220 extends between an idler roll 218, which is positioned adjacent the roll 80, and a driven roll 221. The distance between the roll 218 and the roll 80 is substantially less than the length of a sheet of material. The roll 218 is fixedly mounted on a shaft 224 which is free to rotate in the bearing supports 226 which receive the ends of the shaft. The driven roll 221 is fixedly mounted on a shaft 228 which is rotatably supported by the bearing supports 230. A portion of the shaft 228 extends beyond the bearing support 230 adjacent the side wall 12 and fixedly receives a sprocket wheel 232 thereon. In driving engagement with the sprocket wheel 232 is a chain 234 which is connected through the squeegee assembly, designated generally by the numeral 236, to a driving motor. Thus, the work or sheets of material are transferred from the conveyor 72 to the conveyor belt 220, in the conventional manner, and is transported by the conveyor 220 through the rinse section 30 and the final rinse section 32 into the drying section 34. In the preferred embodiment, the conveyor belt 220 is comprised of a conventional flat wire mesh belt.

Provided in the rinse section 30 are a plurality of longitudinally extending transversely spaced spray pipes 238 which overlie the conveyor belt 220. A transversely extending header 240 connects one end of each of the pipes 238 and supplies the solvent or detergent to these pipes. The pipes 238 are provided with longitudinally spaced apertures through which the solvent is sprayed on to the upper surface of the work which is being transported by the conveyor belt 220. A transversely extending spray pipe 242 extends between the upper and lower portions of the conveyor belt 220 and is provided with a plurality of transversely spaced apertures. The solvent is supplied to the pipe 242 and is sprayed through the aforementioned apertures. The apertures are positioned so that the solvent is sprayed onto the bottom surface of the work or sheets of material being carried by the upper surface of the belt 220.

The final rinse section 32 includes a transversely extending spray pipe 244 which is spaced rearwardly of the spray pipes 238 and which overlies the conveyor belt 220. The pipe 244 is received through an appropriate aperture in the side wall 14 and is supported by the wall 14. A plurality of transversely spaced apertures are provided in the pipe 244 and the solvent which is supplied to the pipe is sprayed through these apertures onto the upper surface of the sheets of material passing therebelow. The final rinse section 32 also includes a second spray pipe 246 which extends transversely between the upper and lower portions of the conveyor belt 220. The pipe 246 is likewise received through an appropriate aperture in the side wall 14 and is supported thereby. Provided in the peripheral wall of the pipe are a plurality of transversely spaced apertures which are positioned so that the solvent flowing through the pipe is sprayed onto the lower surface of the sheets of material on the conveyor belt 220.

*Drying section*

The drying section 34 includes a squeegee assembly 236 which is positioned adjacent to the conveyor belt 220. Thus, the sheets of material which are transported through the final rinse section 32 into the dryer section 34 by the conveyor belt 220 pass through the rolls of the squeegee assembly 236 onto a final endless conveyor belt 248, of the flat wire mesh type.

As shown in detail in FIGS. 10, 11 and 12, the squeegee assembly 236 includes a pair of opposed L-shaped flanges 250 which are respectively connected to the side walls 12 and 14 of the machine 10. The L-shaped flanges 250 include coplanar transversely extending legs which receive the respective ends of a pair of longitudinally spaced channels 252. Mounted upon and straddling the channels 252 are the respective transversely spaced squeegee roll supports. More specifically, the squeegee roll supports include a base 254 which straddles the upper surface of the channels 252 and is affixed thereto by any conventional means. Mounted upon the base 254 are a pair of opposed vertically extending channels 256, 258. The top edge of each pair of channels 256, 258 are connected to a respective transverse flange 296. The web of each of the channels 256 and 258 is provided with a centrally located longitudinal projection 260 and 262, respectively, which extends from the bottom and terminates below the top of the respective channels. The bottom squeegee roll bearing supports 264 are provided with the through bores 266 (FIG. 12). Provided on the sides of the supports 264 are opposed vertical grooves 268. Each of the supports 264 is received between a pair of channels 256, 258 with the respective projections 260 and 262 being received in the grooves 268. A stop member 270 extends upwardly from the base 254 and is positioned to abut the undersurface of the supports 264 to maintain the support spaced from the base 254.

The bottom squeegee roll 272 is fixedly mounted on a shaft 274 the ends of which are rotatably received within the bores 266 in each of the supports 264. A pair of collars 276 are fixedly mounted on the shaft 274 in spaced relation to the respective ends of the squeegee roll 272 and are adapted to abut the opposed surfaces of the supports 264 to prevent the transverse shifting of the roll 272 and to maintain the roll centered between the vertically extending channels. It is to be understood that the stop member 270 is sized so that the roll 272 will be spaced from the upper surface of the supporting channels 252. The end of the shaft 274 adjacent the side wall 12 fixedly receives a sprocket wheel 278 thereon. The wheel 278 is in driving engagement with the chain 234 noted above.

The upper squeegee roll 280 is fixedly mounted on a shaft 282 which is rotatably received in the through bores 284 provided in the upper squeegee roll supports 286. The supports 286 are mounted between the respective channels 256 and 258 in the same manner that the lower squeegee roll supports 264 are mounted. That is, the support blocks 286 are similarly provided with opposed vertically extending grooves which respectively receive the projections 260, 262 therein.

Connected to the top surface of the supports 286, as by welding, are the respective yokes 288. The transverse arm of the yokes 288 is provided with an aperture which receives the respective threaded shafts 290 therethrough. The shafts 290 are rigidly secured to the yokes 288 by the lock nuts 292 which respectively abut the upper and lower surfaces of the transverse arm of the yokes 288. The shafts 290 extend upwardly and are slidably received through an aperture 294 (FIG. 10) provided in the transversely extending flanges 296. Since the lifting apparatus is identical for each end of the assembly 236, only one will be described in detail. A pair of nuts 298 is threaded on the shaft 290 in spaced relation to the flange 296. The nuts 298 support a washer 300. A spring 302 is disposed about the shaft 290 and abuts the upper surface of the washer 300 and the lower surface of a washer 304 which, in turn, abuts the undersurface of the flange 296. A washer 306 is disposed about the shaft 290 and abuts the upper surface of the flange 296. A pair of nuts 308 is threadedly received on the shaft 290 and the lower surface of the nuts 308 abuts the upper surface of the washer 306. A cam plate 310 is fixedly connected to the upper end of the shaft 390 as by welding. Thus, rotation of the cam plate 310 will cause rotation of the threaded shaft 290 relative to the nuts 308 to thereby cause vertical movement of the supports 286 and, consequently, vertical movement of the upper squeegee roll 280. The spring 302 biases the supports 286 and therefore the upper squeegee roll 280 downward into engagement with the squeegee roll 272. The tension in the spring 302 and, therefore, the force exerted by the roll 280 on the roll 272 may be adjusted by moving the nuts 298 and the washer 300 either upwardly to compress the spring and increase the force or downwardly to decrease the tension in the spring to thereby lessen the force.

A shaft 312 extends between the squeegee roll support members and is rotatably received in the bearing supports 314 mounted on the respective flanges 296. The cams 316 are fixedly mounted on the shaft 312 adjacent each end thereof and each of the cams 316 underlies a respective cam plate 310. A radially extending handle 318 is fixedly connected to the shaft 312 so that rotation of the handle 318 will cause rotation of the shaft 312. The cams 316 are sized and positioned so that counter-clockwise rotation of the handle 318 to the position shown by the dashed lines in FIG. 11, will cause the respective cams to engage the undersurface of the associated cam plate 310 and raise the upper roll 280 against the force of the springs 302. The handle 318 is provided with a forwardly extending pin 320 which is adapted to be engaged in a notch 322 in a pivotable member 324 to maintain the roll 280 in the raised position. The member 324 is connected to the undersurface of a channel 326 which, in turn, is connected to the top wall 16 of the machine 10. Thus, by rotating the handle 318 either clockwise or counter-clockwise the roll 280 will be lowered or raised, respectively.

A sprocket wheel 328 is fixedly mounted on the end of the shaft 274 adjacent the side wall 14. In meshing engagement with the sprocket wheel 328 is a driving chain 330 (FIG. 3b) which is driven by a similar sprocket wheel 332 fixedly mounted on one end of a shaft 334. The other end of the shaft 334 fixedly receives another sprocket wheel 336 which is connected to the output shaft of a motor 338 by a chain 340 (FIG. 4b). Thus, the motor 338 drives the lower squeegee roll 272 and, through the connection comprising the sprocket wheels 278 and 232 and the chain 234, also drives the conveyor belt 220.

The shaft 334 is rotatably supported in the bearing blocks 342 and fixedly mounted on the shaft 334 is a driven roll 344. The conveyor belt 248 is spaced from the squeegee assembly 236 by a distance substantially less than the length of the sheets of material and extends to the end of the machine 10. The belt 248 is received between the driven roll 344 and an idler roll 346. The roll 346 is fixedly mounted on a shaft 348 which is rotatably received in the bearing supports 350. Accordingly, the motor 92 drives the conveyor belts 72 and 42 and the motor 338 drives the conveyor belts 320 and 248 and the squeegee assembly 236. Although two separate drive units power the various conveyor sections, in the preferred embodiment the motors 92 and 338 are synchronized. Additionally, the motors have variable speed characteristics so that the entire conveyor system has a variable speed range of approximately 20–50 feet per minute.

As the sheets of material pass through the squeegee assembly 236 they are transferred to the conveyor belt 248 and are transported through the drying section 34 to the unload end 36 of the machine where they are discharged.

Mounted above the conveyor belt 248 and extending longitudinally therewith is the hot air recirculating apparatus, designated generally by the reference character 354. More specifically, the apparatus 354 includes an air treating portion comprising the three chambers 362, 358 and 370. A duct 360, positioned adjacent the rear wall 20 of the machine 10, communicates between the first chamber 362 and the drying section 34. The condensing coils 364 are located in the entrance between the first chamber 362 and the intermediate or second chamber 358. A condensate trap 368 is located below the coils 364 and is positioned to collect the condensate from the air flowing about the coils 364. A centrifugal fan 356 is mounted within the chamber 358 and forces the air through the chamber 370. A motor 371 is mounted on the top wall of the chambers and drives the fan 356. A plurality of heating coils 366 are positioned within the chamber 370. The heating coils 366 may be connected to a source of hot water (not shown) by the conduits designated generally by the numeral 470 (FIG. 2). A ventilation duct 372 is located between the fan 356 and the heating coils 366 and communicates to the atmosphere through the valve member 374. A plurality of longitudinally spaced slots 352 are provided in the bottom wall of the chamber 370.

Accordingly, the solvent laden air flows from the drying section 34, through the duct 360 and chamber 362, into the chamber 358. The condensing coils 364 condense the solvent vapor which is caught by the trap 368. The fan 356 forces the air about the plurality of heating coils 366 (which, in the preferred embodiment, heat the air to a temperature of approximately 140° Fahrenheit) and through the slots 352. As the sheets of material are transported by the conveyor belt 248 to the unload end 36 of the machine, the hot air emitted through the slots 352 dries the objects.

A platform 376 extends inwardly from the rear wall 20 of the machine and terminates adjacent the upper surface of the conveyor belt 248. The platform 376 is inclined inwardly upwardly so that as the sheets of material pass through the drying section 34 they will be transferred to the upper surface of the platform 376 and then slide down the platform 346 to be discharged from the unload end 36 of the machine.

*Solvent dispensing system*

The present device includes a novel solvent dispensing and recovery system which is based upon the cascade counter-flow system and is illustrated in FIGS. 3a, 3b and 4a, 4b. The piping arrangement for the present invention is illustrated in FIGS. 1 and 2. As shown in FIGS. 4a and 4b, the drying section 34 is provided with a bottom wall 377 which is inclined downwardly forwardly from the rear wall 20 of the machine 10 and which terminates in a depending, transverse wall 379 which is located in the final rinse section 32 of the machine. The wall 379 is connected to a horizontal bottom wall 381 which rests on the bed 22 and which terminates in an upstanding wall 383, the height of which is slightly less than the height of the wall 379. An upstanding transverse partition 382 is connected to the bottom wall 381 intermediate the walls 379 and 383. The partition 382 and the walls 379 and 383 respectively define a rear tank 378, located in the final rinse section 32 of the machine, and a forward tank 380, located in the rinse section 30 of the machine. The height of the partition 382 is intermediate the height of the walls 379 and 383. The top edge of the wall 383 is connected to an upstanding wall 385 in the scrubbing section 28 by a wall 384 which is inclined forwardly downwardly; it being understood that the height of the wall 385 is slightly lower than the height of the wall 383. The wall 385 is connected to a bottom wall 388 which extends forwardly along the bed 22 of the machine 10 and which terminates in a transverse upstanding wall 390. The walls 385 and 390 and the bottom wall 388 define a tank 386 which is located below the spray 212 in the scrubbing section 28. The wall 390 is lower than the wall 385. As shown in FIG. 4a, the wall 390 is spaced rearwardly of the baffle 64 below the portion 62b. A bottom wall 392 is connected to the wall 390 at a point spaced above the bed 22 of the machine and is included forwardly downwardly and terminates in a forwardly upwardly inclined transverse wall 394 which extends between the side walls of the machine. The wall 394 is positioned forwardly of the baffle 64. A downwardly forwardly inclined wall 396 is connected to the wall 394 at a point spaced from the top of the wall and terminates in a bottom wall 398 which extends horizontally along the bed 22 of the machine and which terminates below the baffle 60. An upwardly forwardly inclined wall 400 connects the bottom wall 398 to the front wall 18 of the machine. The walls 396, 398 and 400 define a tank 402 therebetween. Similarly, the walls 390, 392 and 394 define a tank 404. The member 62b of the baffle 62 extends from the baffle 62 to a point spaced above the top of the tank 386. The member 62a of the baffle 62 extends to a point spaced above the top of the tank 402. It will now be understood that as each tank overflows the overflow will run in the succeeding forward tank.

As shown in FIGS. 1 and 2, a still 406 distills the solvent and supplies the distilled or clean solvent to a pump 408 through the conduit 410. The pump 408 pumps the solvent to the spray pipes 244 and 246 through the connecting pipe 412. The solvent, which is emitted through the spray pipes 244 and 246 in the final rinse section 32, falls into the tank 378 (FIG. 4b). When the tank 378 fills, the solvent in the tank overflows into the rinse tank 380. A drain pipe 414 is located in the bottom of the rinse tank 380 and is connected to a pump 416. The pump 416 pumps the solvent through the pipe or conduit 418 and the header 240 to the spray pipes 238. The spray pipe 242 is similarly connected to the pipe 418 and receives the solvent from the pump 416. The inlet to the pump 416 is also connected to a drain line 420, which is common to all the tanks in the machine 10, by a conduit 422. The outlet of the pump 416 is also connected to the still 406 by a conduit 424. Thus, when it is desired to empty the tanks quickly, appropriate valves (not shown) are operated to shut off the flow of solvent in the pipe 418 and allow the solvent to flow through the pipes 422 and 424 to thereby drain the solvent from all the tanks and pump the solvent into the still 406. On the other hand, when the machine is operating, the lines or pipes 422 and 424 are shut off.

The solvent emitted through the sprays 238 and 242 falls into the tank 380. When the tank 380 fills, the solvent overflows and runs down the sloping wall 384 into the tank 386. The solvent in the tank 386 is heated to 120° F., approximately. A pump 426 pumps the solvent in the tank 386 to the spray pipes 206 which are rotatable with respect to the machine 10 through the conduits 428 and 430 and the flexible couplings 210. The pump 426 also supplies solvent to the spray pipe 212, which is connected to the conduit 428. A temperature regulating device of known type, designated generally by the numeral 432, maintains the temperature of the solvent in the tank 386 at the approximate 120° F. The solvent which is sprayed through the nozzles 208 in the respective pipes 206 strike the respective bottom wall 384 and the member 62b and flows down these members into the tank 386.

The solvent which fills the tank 386 overflows into the tank 404. A drain conduit 434 provides a path for flow of the solvent in the tank 404 to a pump 436. The pump 436 is connected to the filters 438 through a conduit 440. The filters 438 are connected to the header 68, which supplies the solvent to the spray pipes 66, by a conduit 442. Similarly, the spray pipe 70 is connected to the conduit 442 by a conduit 444. Thus, the pump 436 drains the solvent from the tank 404 through the drain line 434 and pumps the solvent, through the filters 438 and conduits 442 and 444 to the sprays in the washing section 26. The members 60a and 62a overlie the tank 402 so that the solvent emitted from the spray pipes 66 and 70 will run down these respective members into the tank 402. A temperature control 446 similar to the control 432 is located in the washing section 26 and accordingly regulates the temperature of the solvent in the washing section.

The condensing trap 368 of the hot air recirculation apparatus 354 is provided with a drain 448 which is connected, through the conduit 450, to a point overlying the tank 378. Thus, the solvent condensed from the vapors passing through the apparatus 354 will be recaptured.

It will now become apparent that the solvent in each of the tanks becomes dirtier in the forward direction and the cleanest solvent will appear in the rearmost tank 378, which receives the solvent from the still 406. To put this another way, as the sheets of material progress through the machine they are cleansed with a cleaner solvent than in the preceding section.

A drain 452 connects the tank 402 with the main drain line 420. The main drain line 420 is connected to the still 406 by a conduit 454. Thus, the solvent in the tank 402 is connected, through the drain 452 and the conduits 420 and 454 to the settling tank or still 406. The dirty solvent is drained from the tank 402, distilled in the still 406, and then supplied to the pump 408 in the final rinse stage as clean solvent. An overflow pipe 458 is connected to the main drain line 420 and is positioned adjacent the top of the tank 402 to limit the height of the solvent in the tank. A filter 456 is connected in the main drain line 420 to provide for the further filtering of the solvent drained from the tank 402.

The tanks 404, 386, 380 and 378 are connected to the main drain line 420 by the respective drain pipes 460, 462, 464 and 468. During the normal operation of the machine 10 the drain pipes 460, 462, 464, and 468 are closed by appropriate valves (not shown) so that the solvent in the tank 402 only will be supplied to the still 406 through the open drain pipe 452. However, when it is desired to clean the machine all the drain pipes may be opened and the pump 416 operated in the above noted manner to quickly and efficiently drain the solvent from the tanks. For this operation, the line or pipe 454 may be connected to a storage tank which would retain the solvent during the cleaning of the machine 10 rather than being connected to the still 406.

The aforenoted baffles, which define the various sections of the machine, provide a device for retaining the solvent vapor within the appropriate sections. Additionally, a plurality of condensing coils 470 (FIG. 4a) are located adjacent the load end 24 of the machine and condense the solvent in the vapors which attempt to leave the machine through the opening 38. The condensing coils 470 are connected to a conventional recirculation type of cooling system (not shown) by the conduits 474. Similarly, a plurality of condensing coils 476 are positioned adjacent the baffle 222 in the final rinse section 32 and condense the solvent in the vapors which attempt to enter the drying section 34 from the final rinse section 32. The condensing coils 476 are similarly connected to a recirculation type of cooling system (not shown) by the conduit 478. Additionally, the ducts 480 and 482 are located at the respective load end 24 and unload end 36 of the machine 10 and are connected to an absorbing unit 484. These conduits 480 and 482 or ducts capture substantially all the vapors that escape through the respective load and unload end openings to prevent any solvent from being exhausted to the atmosphere.

The internal elements of the machine 10 are preferably fabricated from non-corrosive materials. Additionally, it is to be understood that easy-access type doors are provided adjacent the bottom of the tanks in either one or both side walls of the machine to allow the operator to clean the sludge out of the bottom of the machine during the cleaning of the machine.

*Operation*

In operation, the clamps 200 are loosened by loosening the bolts 202 and the turret plates 98 of the respective scrubbing assemblies 94 are rotated so that the brushes 96 of each of the scrubbing assemblies are set at the desired angle with respect to the conveyor belt 72. Thereafter the clamps are tightened. The handle 124 of each assembly is rotated to lower the respective brush 96 so that they are spaced from the top of the conveyor belt 72 by the desired height in accordance with the thickness of the sheets of material which are to be cleaned. In a similar manner, the shafts 290 of the squeegee assembly 236 are rotated to space the upper squeegee roll 280 from the lower squeegee roll 272 by the desired distance such that when the sheets of material pass between the squeegee rolls the excess solvent is squeezed from the surfaces of the sheets of material. It is to be understood that the handle 318 is rotated to the position shown by the solid lines in FIG. 11. The drain lines 460, 462, 464 and 468 are closed and the drain pump lines 424 and 422 are similarly closed. The motors 92 and 338 are energized to operate the respective conveyor belts 42, 72, 220 and 248. Additionally, the squeegee rolls will be operated in the manner noted above. The brush assembly motors 182 and the fan motor 370 are similarly energized to respectively cause rotation of the brushes and operation of the fan in the hot air recirculation apparatus 354. The work may then be loaded into the machine 10. The sheets of material containing the masking coating thereon are transported by the upper surface of the conveyor belt 42, through the opening 64 in the baffle 60, into the washing section 26 of the machine 10. Solvent is sprayed onto the upper and lower surfaces of the sheets of material through the respective spray pipes 66 and 69. The work then travels through the opening 64 in the baffle 62 into the scrubbing section 28 of the machine 10.

As noted above, the sheets of material normally cling to the fabric belts 72a, 72b and 72c thereby eliminating the need for gripping fingers to hold the material or work as it is being scrubbed by the brushes 96. Accordingly, the sprays 206 spray solvent onto the upper surface of the work and the brushes 96 scrub the upper surface of the work as the material passes beneath the brushes. The flanges 82 break the adhesion between the sheets of material and the fabric belts 72, 72b and 72c and thereby prevent the material from being carried around the roll 80 and, hence, falling into the tank 386.

The conveyor belt 220 transports the work on the upper surface thereof through the opening 216 in the baffle 70 into the rinse section 30 of the machine. The respective spray pipes 238 and 242 spray the respective upper and lower surfaces of the work with the solvent dispensed from these sprays. The sprays 244 and 246 additionally spray solvent onto the work which is being transported by the belt 220. It is to be understood that the solvent being dispensed from the respective sprays 244 and 246 is coming directly from the still 406.

The squeegee assembly 236 is positioned so that the sheets of material being transported on the upper surface of the conveyor belt 220 will be received between the respective rolls 280 and 272 of the squeegee assembly, which squeezes the excess solvent from the sheets of material as they pass between the rolls and on to the conveyor belt 248. The hot air which is forced through the slots 352 by the hot air recirculation apparatus 354 will evaporate any solvent which is left on the material. Finally, the belt 248 will transport the material or sheets of work to the platform 376. Thus, the sheets of metal will reach the unload end 36 of the machine where the material may be removed in its cleaned, scrubbed state.

Accordingly, a sheet cleaning machine has been provided which is mounted on a horizontal bed and wherein the path of travel of the sheets of material is along a horizontal plane. Additionally, the machine incorporates a novel scrubbing assembly wherein the brushes may be rotated to any angle with respect to the path of travel of the sheets to eliminate any brush streaks which may appear on the sheets and to make the efficiency of the scrubbing action maximum. Moreover, special work gripping devices are eliminated in the present invention.

While a preferred embodiment of the invention has been described herein it will become obvious to those skilled in the art that modifications may be made therein without departing from the spirit or scope of the present invention.

What is claimed is:

1. In a sheet cleaning machine, an initial washing station including spray means for spraying a liquid solvent on the sheets passing through said washing station, a scrubbing station including brush means for brushing the upper surface of sheets passing throug said brushing station, and conveyor means for transporting the sheets through the machine in substantially a horizontal plane, said conveyor means including a plurality of transversely spaced fabric belts adapted to receive the wet sheets across adjacent ones of said plurality of belts to carry the wet sheets through said scrubbing station, the said belts being formed of a material which will provide adhesion between the said belts and the said plates whereby the sheets adhere to said adjacent ones of said plurality of fabric belts, means associated with said conveyor means to break the adhesion between said belts and said sheets whereby the sheets may be easily removed therefrom.

2. A sheet cleaning machine as in claim 1, wherein said last means includes flanges positioned adjacent the edges of each of said plurality of fabric belts at the end thereof, said flanges being sized to extend beyond the upper surface of said plurality of fabric belts.

3. An enclosed sheet cleaning machine having top, bottom, side, front and rear walls, a charge opening in said front wall for introducing sheets into the machine, and a discharge opening in said rear wall for discharging cleaned sheets from the machine; said machine including conveyor means for transporting sheets from said charge to the discharge opening in substantially a horizontal plane through the machine; a washing station including spray means for spraying a liquid on the sheets passing therethrough; a scrubbing station including brush means for scrubbing the sheets passing therethrough, said brush means including a rotating brush adapted to scrub the upper surface of the sheets passing thereunder, and mounting means for mounting the brush on the top wall of said machine for angular movement with respect thereto; a rinsing station including rinse means for spraying the sheets passing therethrough with a liquid; and a drying station including drying means for drying the sheets of material prior to their discharge from the machine.

4. A sheet cleaning machine as in claim 3, wherein said conveyor means includes at least one endless fabric conveyor belt received about rollers positioned at each end thereof for carrying wet sheets beneath said brush means whereby the sheets naturally adhere to the fabric belts, and radial flanges mounted on the roller nearest the rear wall adjacent the edges of the belt, said flanges being sized to extend beyond the upper surface of said belt to break the natural adhesion between said belt and the sheets passing over the flanges.

5. A sheet cleaning machine as in claim 4, wherein said top wall is provided with a through bore, and wherein said mounting means includes a turret plate having a diameter greater than the diameter of said bore, stanchion means depending from said plate and extending through said bore for supporting said brush for rotatable motion with respect thereto, and clamping means connected to said top wall for releasably clamping said turret plate in a predetermined angular position, whereby said turret plate may be rotated to change the angular position of said brush when the clamping means is released.

6. A sheet cleaning machine as in claim 5, wherein said stanchion means includes an axially movable portion, a shaft threadedly engaging said axially movable portion to effect axial movement of said portion upon rotation of said shaft, and means for rotating said shaft whereby axial movement of said axially movable portion moves said brush in the vertical direction to accommodate sheets having varying thicknesses.

7. A sheet cleaning machine as in claim 6, wherein said brush means further includes drive means, chain means for connecting said drive means to said brush for rotating said brush, and tensioning means connected to said chain means for maintaining the tension in said chain means substantially constant for different vertical positions of said brush.

8. Brushing apparatus for a sheet cleaning machine of the type including a scrubbing station for scrubbing the surface of sheets carried therethrough by a conveyor, said bushing apparatus including a plate rotatably mounted on said machine, a brush stanchion means depending from said plate for rotatably supporting said brush above the conveyor, drive means for rotating said brush, and clamping means connected to the machine for releasably clamping said plate to affix said brush in a preselected angular position relative to the conveyor, whereby the angular position of the brush may be changed by releasing the clamping means and rotating the plate.

9. Brushing apparatus as in claim 8, and a source of liquid solvent, a spray pipe mounted on said plate and positioned to spray a liquid onto the sheets being transported by the conveyor, and a flexible coupling connecting said source to said spray pipe.

10. Brushing apparatus as in claim 8, wherein said stanchion means includes a portion adapted to move in a vertical plane to provide for the vertical movement of said brush relative to the conveyor, a shaft threadedly engaging said movable portion whereby rotation of said shaft causes movement of the movable portion, and means connected to said shaft for manually rotating said shaft, and limiting means connected to said stanchion means for limiting the vertical movement of said brush.

11. Brushing apparatus as in claim 10, wherein said drive means includes a motor mounted on said plate and rotatable therewith, a chain for connecting said motor to said brush in driving relation therewith, and tensioning means connected to said chain for maintaining the tension in said chain substantially constant within the limits of vertical movement of said brush.

12. Conveyor apparatus for use in a sheet cleaning machine of the type having a scrubbing station including brushing means for brushing the surface of a wet sheet passing through said station; said conveyor apparatus including a plurality of transversely spaced endless fabric belts mounted between and in driving relation with a pair of rollers respectively positioned adjacent the front and the rear of the scrubbing station, whereby the sheets naturally adhere to said plurality of fabric belts; and release means connected to the roller adjacent the rear of the scrubbing station for breaking the natural adhesion between the sheets and the plurality of fabric belts; and means for rotating one of said rollers to drive said belts in a desired direction.

13. Conveyor apparatus as in claim 12, wherein said release means comprises radially extending flanges mounted on said roller and positioned adjacent the edges of each of said plurality of fabric belts, said flanges being sized to extend beyond the upper surface of said plurality of fabric belts to break the adhesion between the plurality of belts and the sheets passing over said flanges.

14. An enclosed sheet cleaning machine having top, bottom, side, front and rear walls, a charge opening in said front wall for introducing sheets into the machine, and a discharge opening in said rear wall for discharging cleaned sheets from the machine; said machine including conveyor means for transporting sheets from said charge to said discharge opening in substantially a horizontal plane through the machine; a washing station including spray means for spraying a liquid solvent on the sheets passing therethrough; a scrubbing station including brush means and spray means for respectively brushing and spraying with a solvent the sheets passing therethrough; a rinsing station including rinsing means for rinsing with a liquid solvent the sheets passing therethrough; and a drying station including drying means for drying the sheets of material prior to their discharge from the machine; said drying means including squeegee rolls positioned in the path of travel of the sheets for squeezing excess solvent from the sheets; the sheets being sequentially transported through the washing station, the scrubbing station, the rinsing station and the drying station by the conveyor means; each of said stations further including an open top solvent retaining tank on said bottom wall; and pump means for pumping the solvent from preselected ones of said tanks to predetermined ones of said spray and rinse means; the walls separating the tanks on each of said stations being progressively shorter than the preceding wall in the forward direction so that the solvent in one tank overflows into the next tank positioned forwardly thereof, whereby the solvent in each of said tanks is cleaner in the rearward direction.

15. An enclosed sheet cleaning machine as in claim 14, and a separate condenser positioned adjacent the charge and discharge openings for condensing the solvent in the vapors exiting from the machine.

16. An enclosed sheet cleaning machine as in claim 14, and a still for supplying clean solvent to the rinse means, and drain conduits connected to each of said tanks and adapted to be connected to said still for draining said tanks of the solvent.

References Cited by the Examiner

UNITED STATES PATENTS

| | | | |
|---|---|---|---|
| 1,930,575 | 10/1933 | Wynd et al. | 15—77 X |
| 2,282,628 | 5/1942 | Whann et al. | 15—77 X |
| 2,347,511 | 4/1944 | Scarzello et al. | 15—77 X |
| 2,372,599 | 3/1945 | Nachtman | 15—77 X |
| 3,073,430 | 1/1963 | Quinn | 198—28 |
| 3,144,872 | 8/1964 | Kearney | 134—72 |

CHARLES A. WILLMUTH, *Primary Examiner.*

E. L. ROBERTS, *Assistant Examiner.*